(12) United States Patent
Almeida (10) Patent No.: US 7,580,858 B2
(45) Date of Patent: Aug. 25, 2009

(54) ADVERTISING REVENUE SHARING

(75) Inventor: John Almeida, Berkeley, CA (US)

(73) Assignee: UnoWeb Inc., Emeryville, CA (US)

( * ) Notice: Subject to any disclaimer, the term of this patent is extended or adjusted under 35 U.S.C. 154(b) by 0 days.

(21) Appl. No.: 11/677,242

(22) Filed: Feb. 21, 2007

(65) Prior Publication Data

US 2008/0201235 A1    Aug. 21, 2008

(51) Int. Cl.
*G06F 17/60*    (2006.01)
(52) U.S. Cl. .......................................... 705/14; 705/52
(58) Field of Classification Search .................. 705/14, 705/52
See application file for complete search history.

(56) References Cited

U.S. PATENT DOCUMENTS

2005/0125342 A1 *  6/2005  Schiff ........................... 705/39
2007/0061328 A1 *  3/2007  Ramer et al. ................. 707/10
2007/0100653 A1 *  5/2007  Ramer et al. ................... 705/1

FOREIGN PATENT DOCUMENTS

JP            2002007122 A    *    1/2002

* cited by examiner

*Primary Examiner*—Pierre E Elisca
(74) *Attorney, Agent, or Firm*—Louis Ventre, Jr.

(57) ABSTRACT

A method for compensating all parties involved in producing the income stream for a content distributor is presented where the content-hosting site, the content writer and the user doing the interaction with paid contents receive a fair share of the generated income stream.

4 Claims, 6 Drawing Sheets

600 http://
www.contentdistributor.com?ClickerID=msclicker&WriterID=mrwriter
&SiteID=WWWebID&ContentID=Cont456&ClickID=CL456

602

|   | ClickerID | ClickTime | ClickID | ContentID |
|---|-----------|-----------|---------|-----------|
| 1 | msclicker | 12:05 AM  | CL123   | Cont123   |
| 2 | msclicker | 12:06 AM | CL456 | Cont456 |
| 3 | msclicker | 12:09 AM  | CL789   | Cont789   |

604

| ClickerID | ClickCount |
|-----------|------------|
| msclicker | 1          |

606

| ClickerID | SiteID   | WriterID | ContentID | StayTime |
|-----------|----------|----------|-----------|----------|
| msclicker | WWWebID  | mrwriter | Cont456   | 3        |

608

| WriterID | ContentID | NumberClicks |
|----------|-----------|--------------|
| mrwriter | Cont456   | 10           |

610

| SiteID  | ContentID | NumberClicks |
|---------|-----------|--------------|
| WWWebID | Cont456   | 10           |

ADVERTISING REVENUE SHARING

BACKGROUND OF INVENTION

1. Field of the Invention

The field of this invention relates generally to a method for revenue sharing between the content provider/writer, website hosting the content and the user clicking on the advertisings associated with said content and content distributor.

2. Prior Art

Currently, content writers write content that are integrated onto a blog-portal, virtual community and others, the content writer does all the intellectual work and the hosting environment inserts advertisings and other paid content along the user-provided content without compensating the intellectual-proprietor whatsoever. On the other hand, users viewing those contents more often then not, they click on those paid content and as with the content writer, they're not compensated, at all. In the case of RSS (Really Simple Syndication) writers provide the content along with other paid contents and the site presenting the content helps generate the content provider's revenue, and again, without receiving any compensation.

It is the object of the present invention to advantageously provide means for revenue sharing for compensating all parties that are involved in the process of interacting with paid content and helping generate revenues.

SUMMARY OF THE INVENTION

It is the object the present invention to offer a fair mechanism for sharing revenues generated through paid content with those responsible for generating the income stream. In the current in use mechanism, those doing all the intellectual work, commonly known as content provider or content contributors/writers, and users doing the clicking over the paid content don't get compensated at all. The content hosting site places paid content along with user provided content without creating any fair means for compensating those who helps generate the revenue stream.

In a preferred embodiment of the present invention a mechanism will be depicted wherein a fair and just system for compensating those involved in creating the income stream will be presented, then the income source will be fairly divided among content contributors, hosting sites and users doing the clicking over the paid contents, thus, increasing the number of intellectual contributors, readers and content-hosting sites.

BRIEF DESCRIPTION OF THE DRAWINGS

The accompanying drawings, which are incorporated in the form a part of this specification, illustrate embodiments of the invention and, together with the description, serve to explain the principles of the invention.

DESCRIPTION OF THE INVENTION

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

As will be appreciated by those of skill in the art, the present invention may be embodied as a method or a computer program product. Accordingly, the present invention may take a form of an entirely software embodiment or an embodiment combining software and hardware. Furthermore, the present invention may take the form of a computer program product on a computer-readable storage medium having computer-readable program code means embodied in the medium. Any computer readable medium may be utilized including but not limited to: hard disks, CD-ROMs, optical storage devices, or magnetic devices.

Also, any reference to names of a product or of a company is for the purpose of clarifying our discussion and they are registered to their respective owners.

A preferred embodiment of this invention will now be presented in detail as to enable those of the skill in the art to practice the invention. With the explosion of ways for presenting online content over the Internet, there are a number of content hosting sites like, but not limited to: blogs, RSS (Really Simple Syndicate), virtual communities, photo sharing sites, video sharing sites, etc. These hosting environments offer means for their user base to place and view contents, the hosting environment in turn places paid contents inserted into the user provided contents or along with, without any kind of compensation whatsoever for the content provider nor to any other involved party taking part in generating the income.

Thus, It is the object of this invention to provide a fair and just mechanism for compensating all of the involved parties helping in the generating of the income stream for the hosting site, content provider and user (user is do one who reads, views and clicks over the paid content, henceforth called user, viewer or clicker and used interchangeably).

There are many ways for placing contents in a web site, by having a server as the host of the contents and the advertising or registered web sites presenting them to user trough a web service (a program in the server to allow the server to serve a requesting computer with services and/or contents), thus, the contents on the websites can be requested from the server and saved locally (cached) or they can be presented virtually to interfacing users. And in either case, the server does the inserting of paid contents into the content page.

All participating parties in the income-share program will be registered with the server providing the contents. Once a user clicks on advertising, the server will charge the click to the advertiser and give a commission to the user who clicked, to the web site hosting the content and to the content provider as well. Also, a mechanism will be in place to stop fraud where a user clicks on a paid content for the purpose of receiving for the click.

The objective of an advertiser is to have as broad exposure as possible by having the greatest possible number of viewers and for the advertisings-distributors to have the greatest per clicks paying customers and the broadest possible user-base. As it will be presented shortly, this is the objective of this invention, in addition to; all the participating parties will be compensated for their time and efforts without overcharging the advertiser.

As it will be appreciated to those of the skill in art, the mechanism of this invention will be setup in such way that it will prevent fraud, compensate all parties, increase revenues, customer loyalty and customer satisfaction by having the user participating in the program to stay at the site of the clicked advertising for a period of time before clicking another advertising within the system, otherwise the click will be invalidated without charging the advertiser for the invalidated click, thus, preventing overcharge and fraud.

On the other hand, the content providers' (content writer) objective is to have the content placed in the greatest possible number of web sites and the broadest possible exposure to the content's intellect message. Since the Internet is becoming a universal virtual grid where content is hosted in one location (dynamic) and virtually presented at many other locations (the physical hosting is done by the dynamic hosting site and the virtual hosting site does the presentation to a user without processing the actual content). By having a mechanism to compensate the hosting-site (dynamically/virtually), the content writers and the clicker as well, a broad base of high quality content will be available for the creation of specialized virtual content hosting sites and portals, thus benefiting everyone along the way. The virtual presentation can be done from a single location or over the Internet by the use of web controls technology.

As it will be appreciated to those of the skill in the art, this invention will enable the building of the next generation of a universal virtual media. This method can work individually by paying commission only to the user, paying commission only to the website or paying commission only to the clicker or any combination thereof.

I) The Theory of Internet Communication

Figure 5:
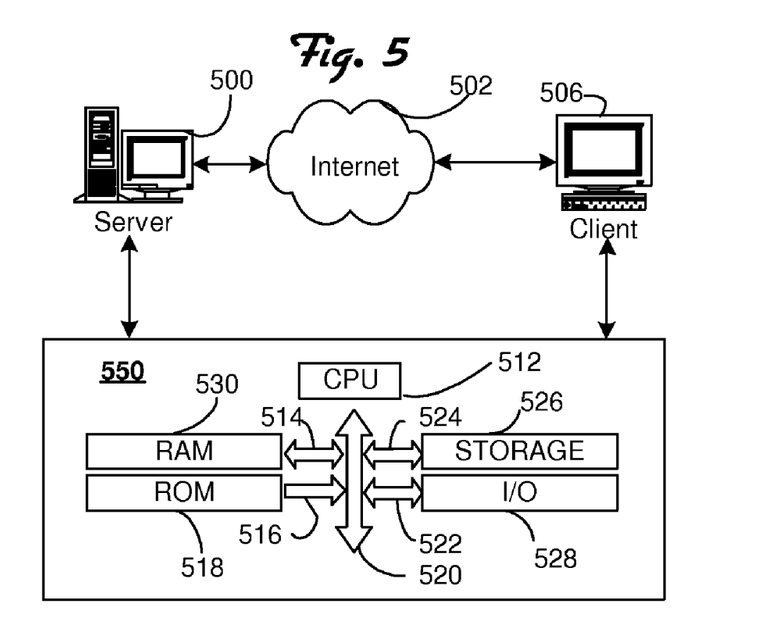
FIG. 5 illustrates client/server communication over the Internet/Network and an electronic representation of a computing device.

Lets start our discussion by reviewing Internet communication and as we turn our attention to FIG. 5, it illustrates a server 500, the Internet 502 and a client computer 506. The Internet channel 502 is the communication channel between the client 506 and the server 500. The client 506 initiates a request for contents from server 500 and it returns contents thereafter. The Internet is the transport vehicle for transporting data between the two computers. Each computer of the illustrated arrangement, the server 500 and the client computer 506, each has an electronic processing unit 550 responsible for its functionalities.

The electronic unit 550 may or may not have all the components, or may have more components than those depicted thereon. In any case each will have at least some basic electronic units like the CPU 512 and it is the brain of the device responsible for all of the device's functionalities. At power up, the CPU 512 loads instructions from ROM 518 and the instructions will instruct the CPU 512 to load an Operating System (OS) from the storage unit 526 (it can be a magnetic disc, CD ROM, etc) into RAM 530. As needed the electronic device will communicate to outside environment through its I/O port 528 and in the case of the illustrated devices, it can be a network card that allows communication using the Internet.

The CPU 512 communicate differently with each of its connected electronic unit, in some cases the communication and interaction is two-ways and in other instances, one-way. As for the illustrated device 550 the CPU 512 does a one-way communication with the ROM 518 (one-way arrow 516) unit and two-way communication with all other devices as indicated by the two-way arrows (514, 520, 522 and 524). As it is clear to those of the skill in the art, each device will have input means as well, like a mouse, keyboard, and other visual interfacing means like a screen, etc.

All participating parties will use the aforementioned arrangement of FIG. 5 to register with the content distributor server and provide the profiling information for the purpose of the users interaction with it. The clicker will be logged in with the content distributor server, as to enable the content distributor server to track the clicker's activities therewith. This mechanism will be explained shortly.

II) The Invention

Figure 1:
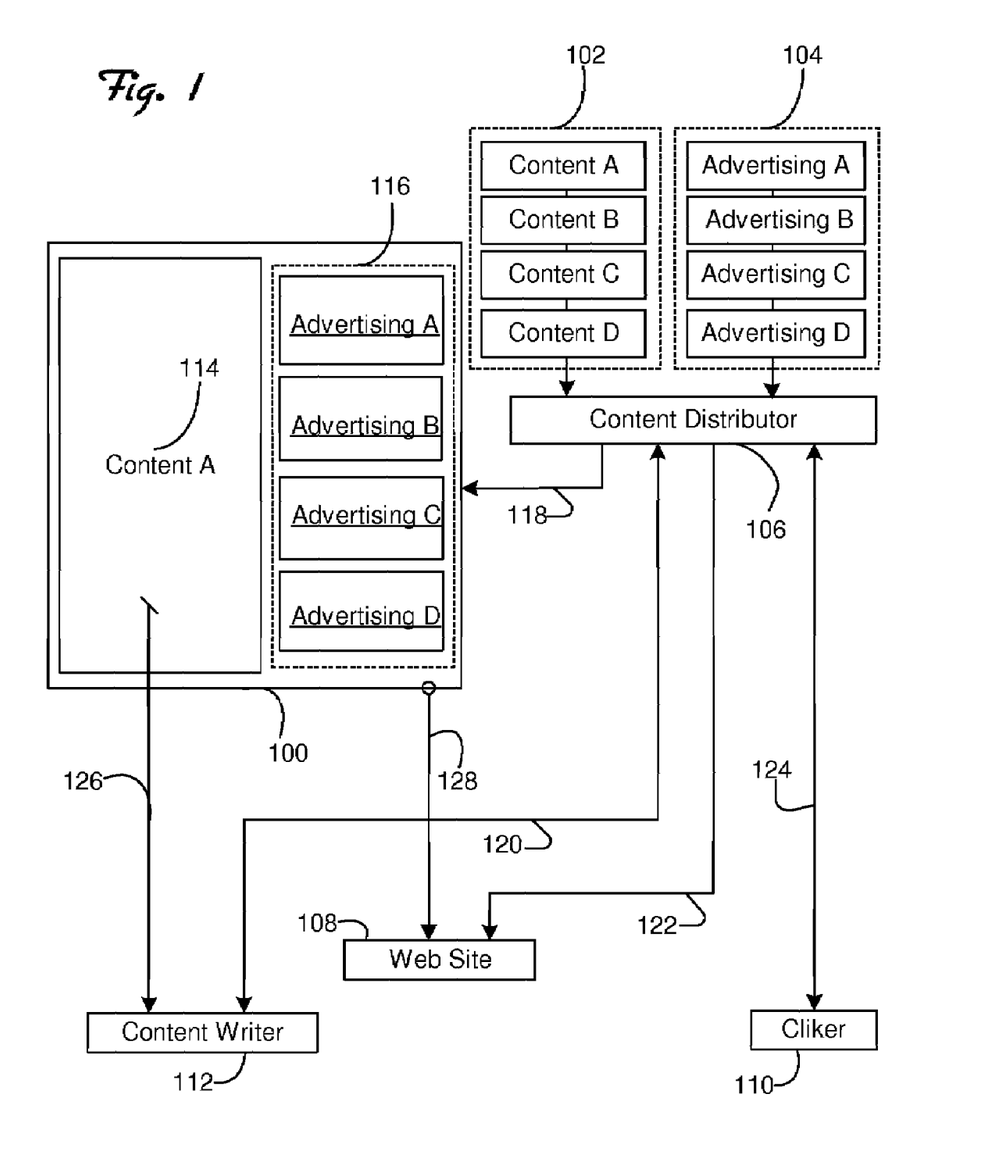
FIG. 1 illustrates a preferred embodiment of this invention in which a content distributor supplies user provided contents along with paid content to a hosting site and a mechanism to compensate the hosting site, the content provider and the content reader.
Figure 2:
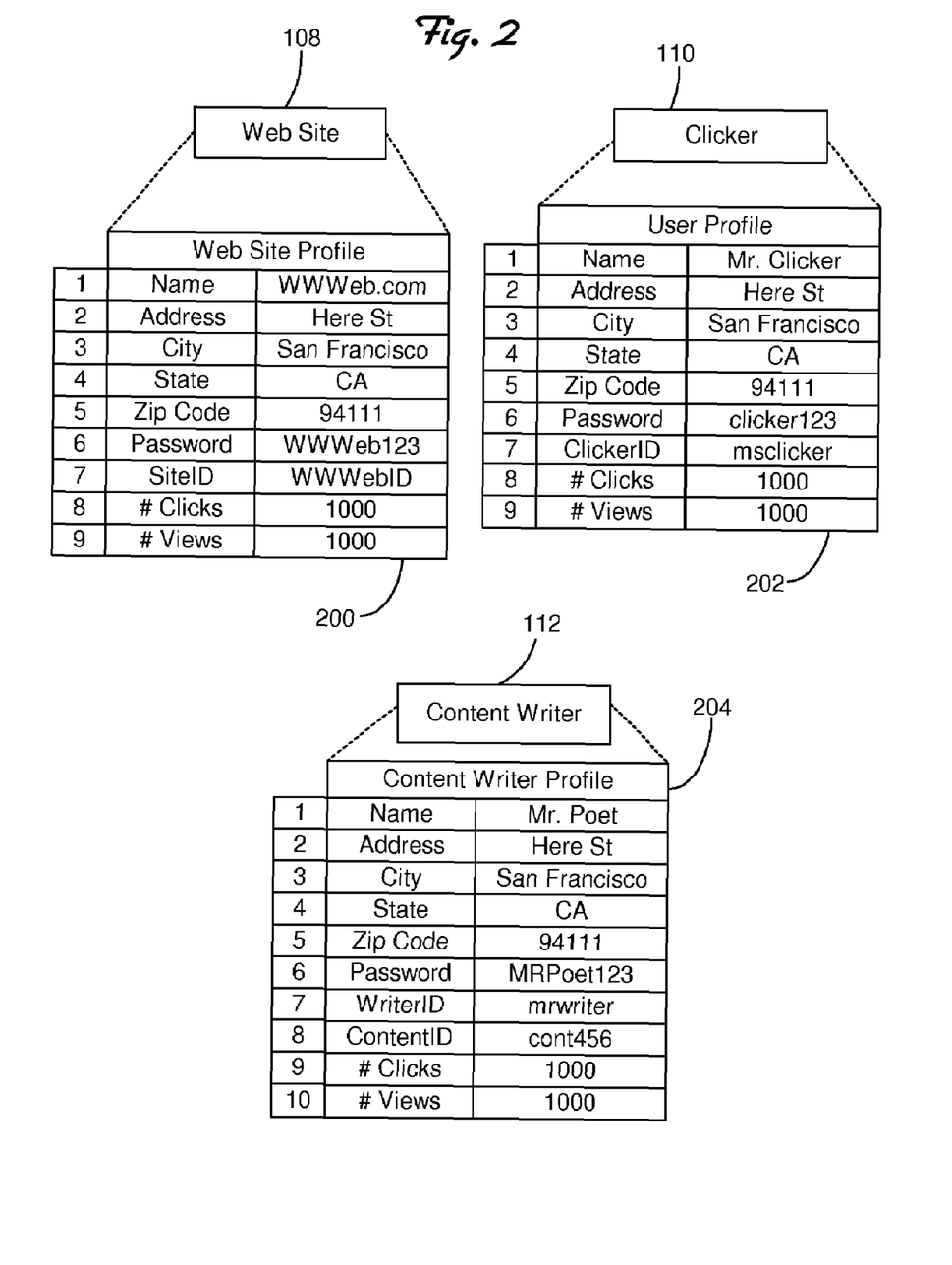
FIG. 2 illustrates three tables related to the embodiment of FIG. 1.

Lets keep FIG. 1 and FIG. 2 handy. As we now turn our attention to FIG. 1 and it illustrates a preferred embodiment of this invention where a content distributor 106 (the host of contents and paid-contents) provides a content page 100 having Content A 114 and Advertisings A-D 116, Content A 114 was supplied by content distributor 106 from the Content group 102 (the first content) and Advertisings A-D 116 from the Advertising group 104. As indicated by the arrows 118, 120, 122, and 124, content distributor 106 has association with the Content Writer 112, Web Site 108 and Clicker 110. As for Content A 114 it has relationship with Content Writer 112 and content page 100 has relationship with Web Site 108 as indicated by arrows 126 and 128 respectively.

As indicated by arrow 120, Content Writer 112 places contents at the Content Distributor 106, Web Site 108 places Contents 114 therein from Content Distributor 106 and the Content Distributor 106 places advertisings 116 into the Web Site 108 content's page 100. Once the Clicker 110 clicks on advertisings 116, Content Distributor 106 will update the Clicker 110 database table (202—FIG. 2), the Web Site 108 database table (200—FIG. 2) and the Content Writer 112 database table (204—FIG. 2). Tables 200, 202 and 204 of FIG. 2 are shown as a single table for each and including all of the user's/site's profiling and interaction data, however, as we'll see while explaining FIG. 6, they are split in more that one table, the arrangements of FIG. 2 are illustrated as is for the purpose of illustrating the concept using a single table and for the sake of simplicity, as well. It is not intended to obscure this invention and its mode of use in any way whatsoever.

Figure 3:
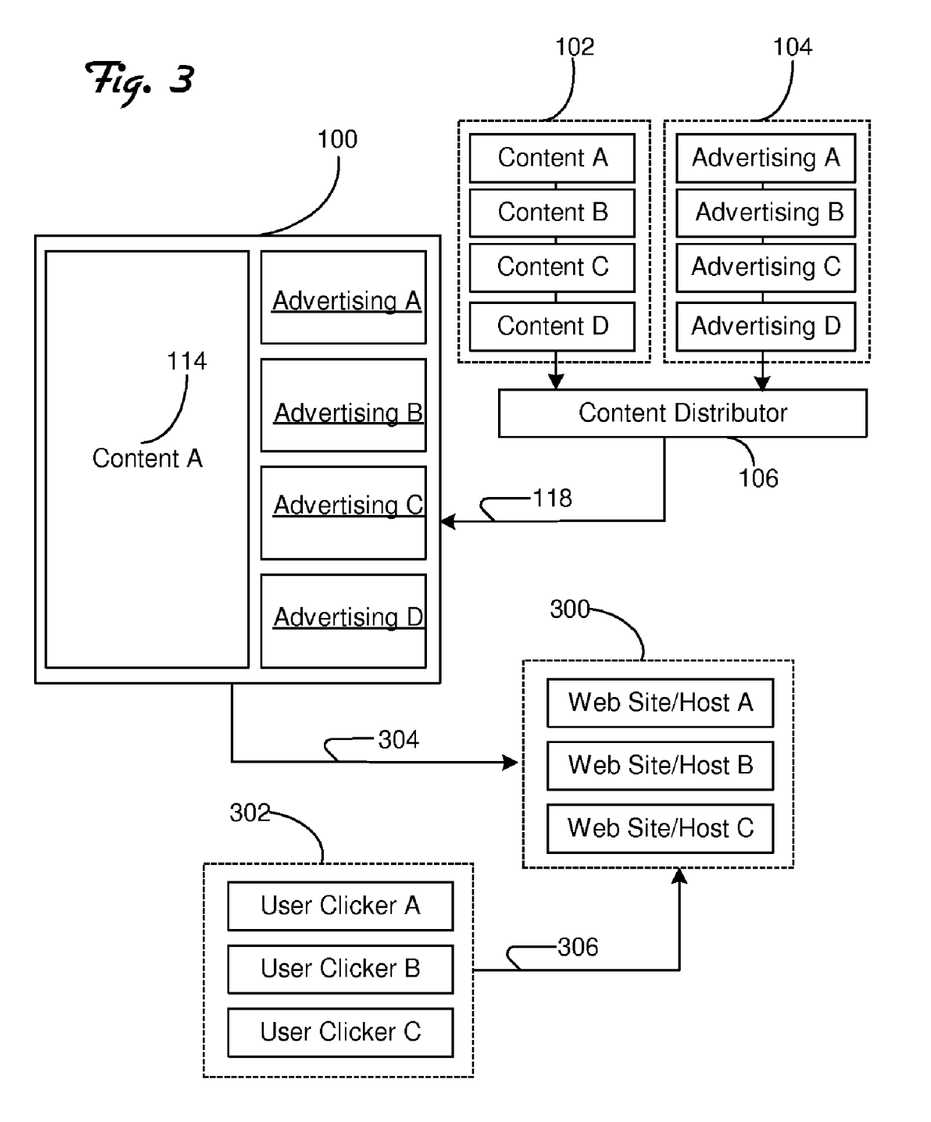
FIG. 3 illustrates a further explanation of the embodiment of FIG. 1 where the provided content is hosted by a plurality of sites and a plurality of users interacting with the content.

As we turn our attention to FIG. 3 and it illustrates a further embodiment of FIG. 1 with the addition of a group of clickers 302 and a group of web sites 300. As it is illustrated and as aforementioned, content distributor 106 make its contents and advertisings available to a plurality of hosting environments and a plurality of clickers clicks on those advertisings, and once again, by the illustration given, it becomes clear that this invention will enhance all parties in a way not currently available, by increasing the number of available contents and as we'll see shortly, it will increase the income stream for all involved parties therewith, as well.

Figure 4:
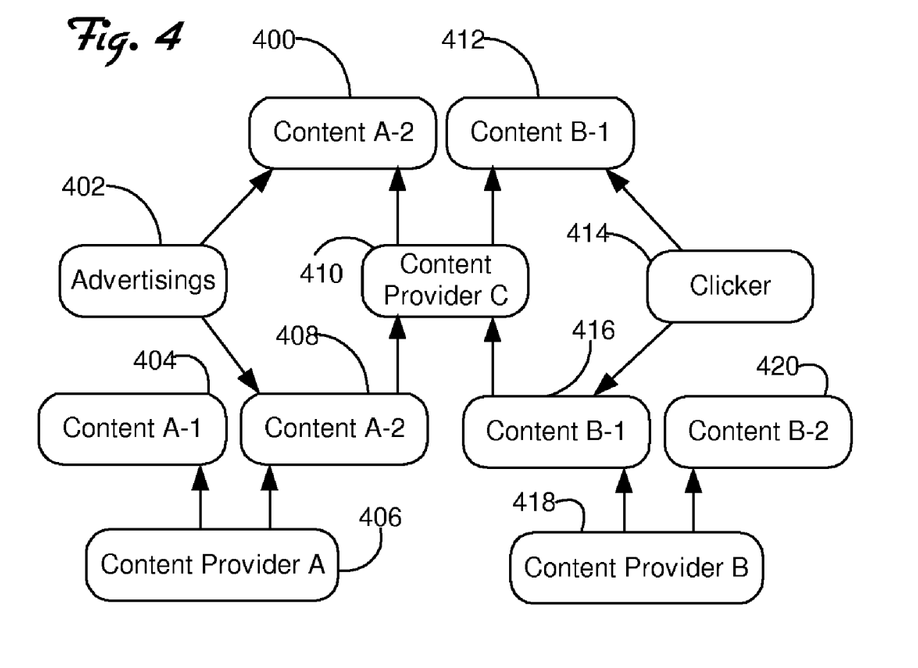
FIG. 4 illustrates dynamic and virtual contents, advertisings and users interactions with them all.

As we now turn our attention to FIG. 4 and it illustrates a further embodiment of FIG. 1 and FIG. 3. As already explained elsewhere, the Internet is a Global grid where contents are virtually and dynamically hosted and available to a broad-worldwide user base as never before possible and offering a tremendous potential for the content provider, content host, content distributor and clicker. Lets proceed with FIG. 4. As we analyze it, there are two dynamic contents providers (physically hosting the contents) and they are: Content Provider A 406 hosting two contents Content A-1 404 and Content A-2 408; Content Provider B 418 hosting two contents as well, Content B-1 416 and Content B-2 420. There is one virtual content host and it is Content Provider C 410 and it is virtually hosting Content A-2 400 and Content B-1 412. The virtual Content B-1 412 is the dynamic Content B-1 416 and the virtual Content A-2 400 is the dynamic Content A-2 408. As we further analyze it, we see that Advertisings 402 is placed at the dynamic Content A-2 408 and the virtual Content A-2 400 as well. As for the Clicker 414 is clicking the dynamic Content B-1 416 and the virtual Content B-1 412. The illustration of FIG. 4 depicts the interaction that happens within the content distributor 106 of FIG. 1. Now, the dynamic content providers (418 and 406) and virtual content hosting sites don't necessarily needs to be integrated within content distributor 106 of FIG. 1 infrastructure, they can be located anywhere on the Internet/Network and communicating with the content distributor using web services link.

Figure 6:
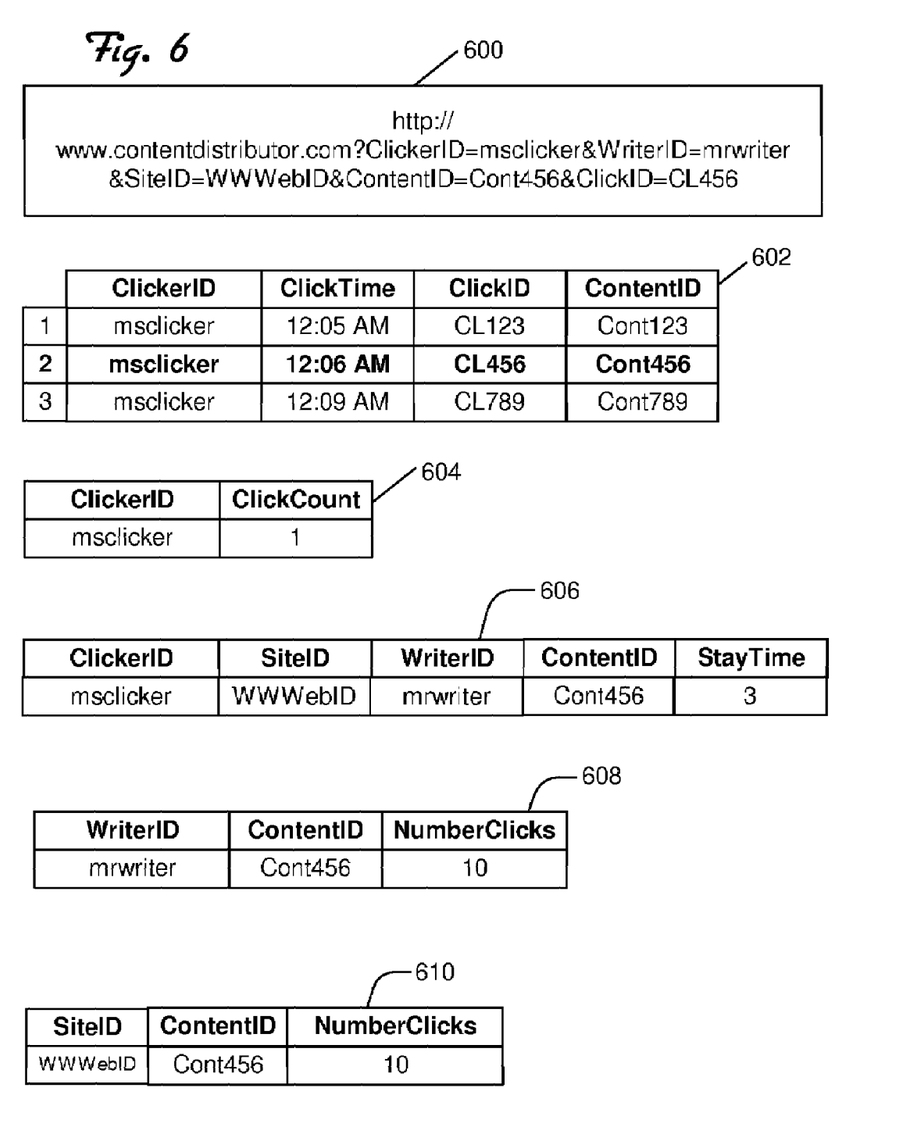
FIG. 6 illustrates a link that will be presented for users to click on paid content and tables for tracking all involved parties in generating the revenue stream.

Lets keep FIG. 2 and FIG. 6 handy. FIG. 6 is a further embodiment of FIG. 2 showing the three tables of FIG. 2 split on more than one table at FIG. 6. Rows #1-7 of table 200 illustrates the site's profiling data and rows #8-9 the number of clicks and number of views for the website. As for table 202 rows #1-7 illustrates the clicker's profiling data and for rows #8-9 the clicker's activities. Rows #1-8 of table 204 illustrates the writer's profiling data and rows #9-10 the activities with the writer's contents. Tables illustrated in FIG. 6 are for rows #8-9 of table 200 along with the site's ID at row #7, rows #8-9 of table 202 along with clicker ID row #7 and rows #9-10 of table 204 along with writer's ID for row #7 and content ID of row #8.

Lets focus our attention to FIG. 6 and it illustrates a link 600 and it is a link (it can as well be any of the links of content group 116 of FIG. 1) that will part of the displayed content page 100 (FIG. 1) at the web site 112 (FIG. 1). As depicted thereon, on the link, it has the website where it is to be redirected to once the clicker clicks on a paid content "www-.contentdistributor.com" and it is content distributor 106 of FIG. 1, "ClickerID=msclicker" and it is row #7 of table 202 of FIG. 2, "WriterID=mrwriter" and it is row #7 of table 204 of FIG. 2, "SiteID=WWWebID" and it is row #7 of table 200 of FIG. 2, "ContentID=Cont456" and it is row #8 of table 204 of FIG. 2, and "ClickID=CL456" and it is assigned by the content distributor 106 of FIG. 1 to the paid content to identify its location once it is clicked upon and it is the value of row #2 column "ClickID" of table 602. The column "ContentID" depicts the ID for each content and a waiting time threshold can be setup for it as well (not shown) as not to allow a paid content to be charged for multiple appearance during a time frame or to be allowed to appear to the same viewer only a number of times during the session, etc., it will help the server to identify multiple clicks over the same content by the same clicker and invalidate clicks in such situations thus preventing fraud.

Lets analyze the other tables of FIG. 6 and they are related to the link 600. Lets start with table 602 and it illustrates three rows and four columns. The column "ClickerID" illustrates the ID for the user doing the clicking and it is a way for the content distributor to track the clicker activities and also a way for preventing the clicker from clicking over links of paid content for the purpose of accumulating commission, in other words, it is used to prevent fraud. Column "ClickTime" stores the time for the last click of the clicker and it will be explained shortly. The column "ClickID" stores a unique ID assigned to each click and it will be a way of tracking the links sent to the clicker and the clicker interaction with them. As it is well know to those of the skill in the art, the "ClickeID" will have a longer values than those taught herein.

As mentioned elsewhere, all involved parties will be registered with the content distributor's server and the clicker will have to be logged in as to log the clicking activities to compensate all involved parties, as well. When a clicker is clicking and viewing paid content the content distributor's server will track the clicker activities for two purposes: to prevent fraud [1] and to pay all of the involved parties [2]. The content distributor's server will have a waiting time-threshold set therein to prevent a clicker from clicking on the paid contents just for the purpose of accumulating commission and for the sake of our discussion, lets say that the waiting time-threshold is two minutes.

Lets further analyze table 602. The first column is for the "ClickerID", once a clicker clicks over a paid content the content distributor's server will log the clicker ID (first column and it is the same as row #7, table 202 of FIG. 2), the second column has "ClickTime" and it is the time the user clicked on the paid content. As we further analyze it, it has for the first row the time of "12:05 AM" and for the second row the time "12:06 AM" and as we've aforementioned that the waiting time-threshold is two minutes. As we subtract the two values (row #1 and row #2) the time-threshold is only one minute and as we'll see in the subsequent tables, the first click is not recorded.

Once a clicker "msclicker" clicks on a paid content's link, the content server will receive the information about the click from the link 600 and as it retrieves and parses it, the click ID "ClickID" will be used to locate the stored information for the clicker on table 602, once the table row is retrieved the content distributor's server will verify the waiting time-threshold by comparing the previous click (row #2 is compared with row #1) and as we've mentioned before, the two clicks don't meet the waiting time-threshold of two minutes and the first click is discarded, the clicker nor anyone else gets paid, thus preventing fraud. The waiting time-threshold can be any value and not necessary two minutes as depicted herein. Further along the interaction the clicker clicks on another paid content and this time the third row is compared with the second row and as indicated, three minutes will have elapsed and the waiting time-threshold met, thus the second click is recorded on subsequent tables, that is, it is paid to all participating parties.

As it is illustrated on table 604 column "ClickCount" the value of "1" is stored therefore for the second click of table 602 for the clicker "msclicker" column "ClickerID". Table 606 stores the clicker's activities and it has for the first column "ClickerID" and it is the ID for the clicker, the second column it has "SiteID" and it is the ID for the site where the clicker is accessing and has clicked on the paid content, the third column has "WriterID" and it is the ID for the content provider/writer, the third column has "ContentID" and it is the ID for the second click (row #2 of table 602 and retrieved from link 600) and the last column (fifth column) illustrated how long the clicker stayed on the page, this is important for deducing user's interest on the clicked paid-content and for marketing purposes.

As we continue, table 608 illustrates "WriterID" for the first column and it is the ID for the writer (content provider), the second column "ContentID" has the ID for the content and the third column has "NumberClicks" it has the total number of clicks that the content has received from all clickers and as for this illustration it is "10", and, it means that content "Cont456" written by "mrwriter" has received "10" clicks from all users (clickers). Lastly, table 610 illustrates for the first column "SiteID" and it is the ID for the web site hosting the content, the second column "ContentID" is the ID for the content that was hosted by the site and receive the click on the paid content and the third column is "NumberClicks" has the number of clicks that the content "Cont456" has received from all clickers while hosted at the site "WWWebID" and it has received "10" clicks so far. Other tables can be present as well, and anyone with the skill in the art will readily appreciate in relation to the disclosure given herein and implement them as necessary.

Figure 7:
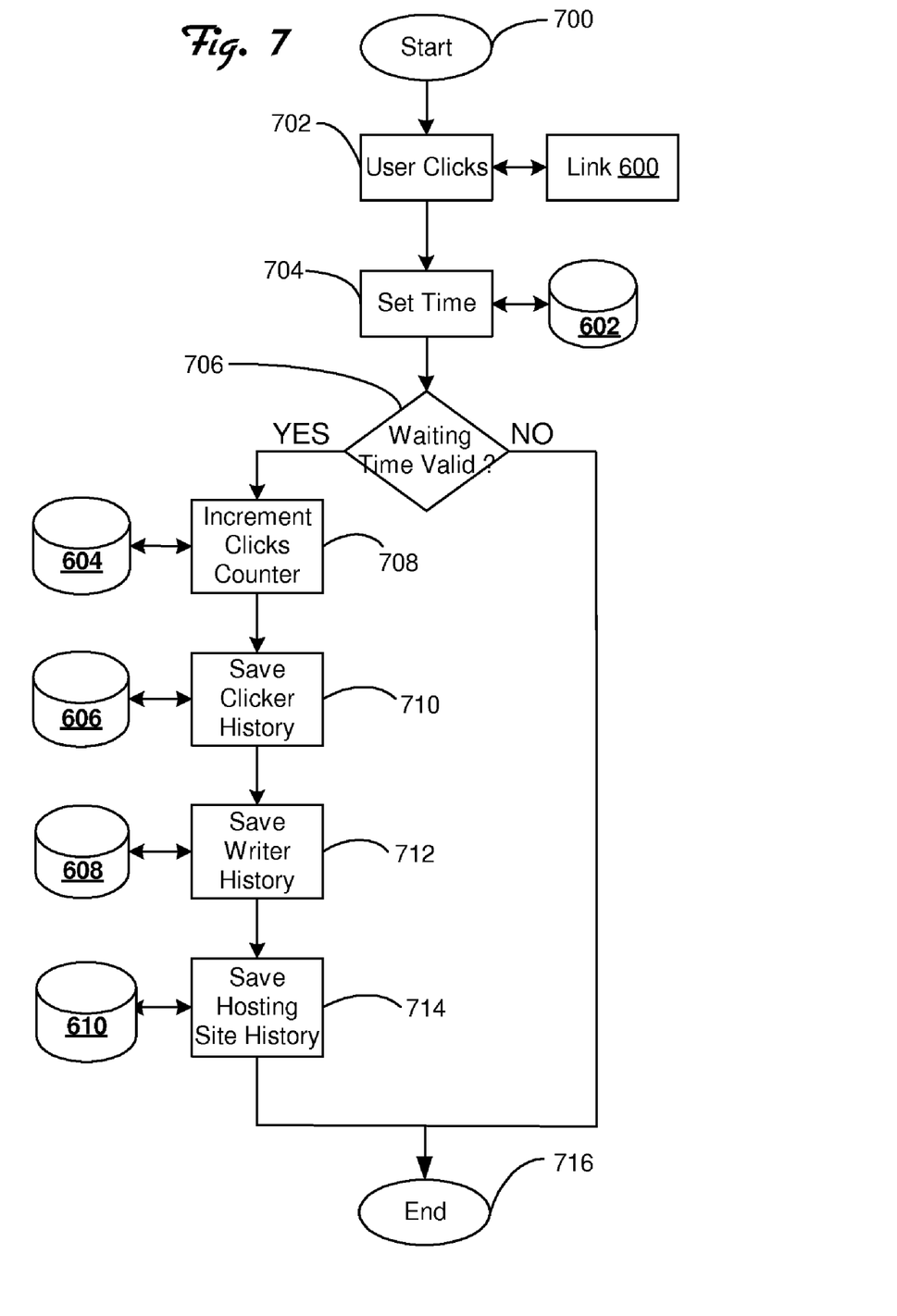
FIG. 7 illustrates a logic diagram for FIG. 6.

As we now turn our attention to FIG. 7 and it illustrates a flowchart for the tables of FIG. 6 at the content distributor's server. At the very beginning the "Start" 700, the logic flow and the means for detecting the user click 702, after a click is detected as it was illustrated on the link 600 of FIG. 6, the time is set for the user and the content as it was illustrated on table 602 of FIG. 6 and indicated by the database symbol next to the box 704. Once a click is received, the content distributor's server checks to see if the click is within the waiting time-threshold as aforementioned, if it isn't (yes/no diamond 706), then the flow will move on without doing anything, if it is (yes/no diamond 706), then the click will be incremented 708 and it is the table 604 of FIG. 6, the click will be saved for the clicker as well 710 and it is table 606 of FIG. 6, the click will be saved for the writer 712 and it is table 608 of FIG. 6, the click will be saved for the content-hosting site 714 and it is table 610 of FIG. 6 and finally, the process will exit 716.

Regarding the commission that will be paid to each participating party of the program, it can be set as a percentage of each click and since each advertising is priced different, it may be like 10% for the writer, 10% for the content hosting site and 10% for the clicker. Of course this is just an illustration and the percentage can be set in any conceivable way. The idea is that all of the participating parties will be compensated for their participation in the process of generating income for the content distributor.

The commission can be base on as per click mechanism where a clicker will receive a specific amount for the click. It can be base on redeemable points where each click represents a number of points that can be redeemed for other amenities, cash value, goods, etc. As for the website hosting the contents from the content distributors and for the content writer supplying the content to the content distributor, they both will be tracked the content distributor as it places contents on the web site. The paid and non-paid content don't necessary need to be on a single page, they can be in separate pages, popup window, frames, etc. The content distributor can host user-supplied content as well along with paid contents.

The form for compensating the involved parties can be base on a mechanism revolving around pay-per-view (for the appearance of a paid content on a webpage) then all parties will receive the commission based on the number of times the non-paid content appeared on each webpage along with the paid content. The mechanism can be setup to use the waiting-time threshold as previously discussed, as well, the system can be setup to just login the number of times the involved parties interact with the paid content and be compensated the same way as it has been explained for the clicking mechanism. Since anyone with the skill of the art will readily know how to implement the pay-per-view mechanism based on the explanation already given for the pay-per-click mechanism, the pay-per-view mechanism will not be explained any further for the fact that the explanation will be redundant. It is done as is for sake of simplicity and not in any way intended to obscure this invention. Furthermore, as it is well known to those of the skill in the art, paid and non-paid content can be any kind of content in any format, e.g. audio, video, print, slide presentation, maps, images, etc., as well, the compensation can be based on just when the interaction happens with paid contents, instead of the relationship of paid and non-paid content as it has been described throughout this disclosure.

Although the present invention and its advantages have been described in detail, it should be understood that various changes, substitutions and alterations could be made herein without departing from the true spirit and scope of the invention as defined by the appended claims. Moreover, the scope of the present application is not intended to be limited to the particular embodiments of the process, machine, manufacture, composition of matter, means, methods, computer software and steps described in the specification. As one of ordinary skill in the art will readily appreciate from the disclosure of the present invention, processes, machines, manufacture, compositions of matter, means, methods, computer software, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, computer software or steps.

What is claimed is:

1. A method of web site development based on advertising revenue sharing, comprising the steps of:
   displaying paid content from an advertiser through a webpage of the web site on a computer;
   logging-in a registered user to allow the registered user to interact with the paid content on a computer;
   totaling a number of interactions by the registered user with the paid content;
   receiving payment from the advertiser for the number of interactions of the registered user with the paid content; and,
   paying the registered user for the number of interactions of the registered user with the paid content,
   wherein the interaction of the registered user comprises clicking on a link to a new link destination within the paid content, provided that a second and subsequent clicking on the link by the same registered user is not an interaction to be counted in the step of totaling a number of interactions unless it exceeds a waiting-time threshold.

2. The method according to claim 1 wherein the interaction of the registered user comprises clicking on a link to a new link destination within the paid content, provided that a second and subsequent clicking on the link by the same registered user is not an interaction to be counted in the step of totaling a number of interactions unless it exceeds a waiting-time threshold.

3. A method of web site development based on advertising revenue sharing, comprising the steps of:
   displaying paid content from an advertiser through a webpage of the web site on a computer;
   registering a content provider to prepare non-paid content for the webpage on a computer;
   totaling a number of interactions by the user with the paid content;
   receiving payment from the advertiser for the number of interactions of the user with the paid content; and, paying the content provider for the number of interactions of the user with the paid content, wherein the user is a registered user, and wherein the interaction of the registered user comprises clicking on a link to a new link destination within the paid content, provided that a second and subsequent clicking on the link by the same registered user is not an interaction to be counted in the step of totaling a number of interactions unless it exceeds a waiting-time threshold.

4. The method according to claim 3 wherein the user is a registered user.

* * * * *